United States Patent [19]
Fitzgerald

[11] Patent Number: 5,282,702
[45] Date of Patent: Feb. 1, 1994

[54] WAFER BROACHING TOOL

[75] Inventor: Brian M. Fitzgerald, Cazenovia, N.Y.

[73] Assignee: New Venture Gear, Inc., Troy, Mich.

[21] Appl. No.: 862,820

[22] Filed: Apr. 3, 1992

[51] Int. Cl.⁵ .................. B23D 43/04; B23F 21/26
[52] U.S. Cl. .................................... 407/16; 407/18
[58] Field of Search ............. 409/244, 131, 265, 299; 407/13, 15, 16, 18, 19

[56] References Cited

U.S. PATENT DOCUMENTS

| | | | |
|---|---|---|---|
| 1,935,774 | 11/1933 | Halborg | 407/16 |
| 3,267,552 | 8/1966 | Psenka | 407/18 |
| 3,270,395 | 9/1966 | Bonnate | 407/15 |
| 3,439,398 | 4/1969 | Zawacki et al. | 407/19 X |
| 4,274,767 | 6/1981 | Bistrick et al. | 407/18 |

FOREIGN PATENT DOCUMENTS

| | | | |
|---|---|---|---|
| 0013189 | 7/1980 | European Pat. Off. | 407/18 |
| 1365819 | 9/1974 | United Kingdom | 407/15 |

Primary Examiner—Z. R. Bilinsky
Attorney, Agent, or Firm—Harness, Dickey & Pierce

[57] ABSTRACT

A finish broaching tool for finish cutting helical splines on the interior of an annular workpiece has a multiplicity of groups of circumferentially disposed teeth. Each group of circumferentially disposed teeth is formed on an individual wafer adapted to be mounted on the trailing end of a conventional broaching bar. The teeth of each wafer are formed on a predetermined helical angle and are adapted to helically align with the teeth of the other wafers. The wafers are sized so as to provide contact between the teeth of two or more wafers throughout substantially the entire finish broaching process.

8 Claims, 3 Drawing Sheets

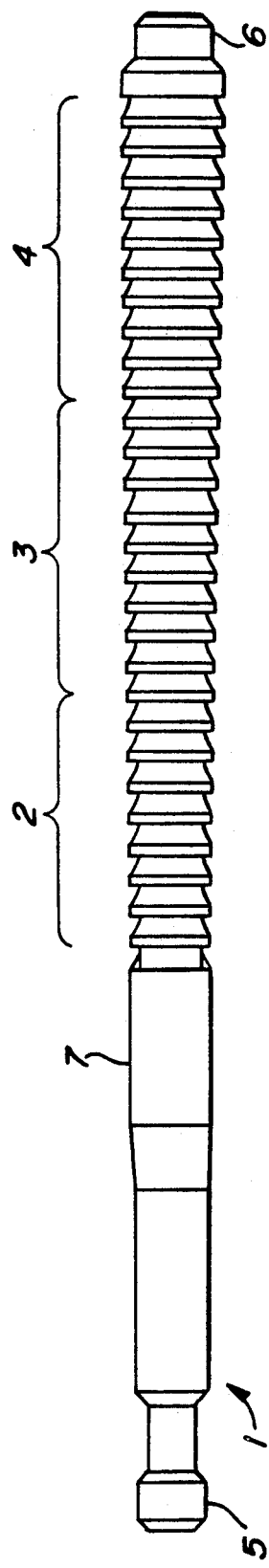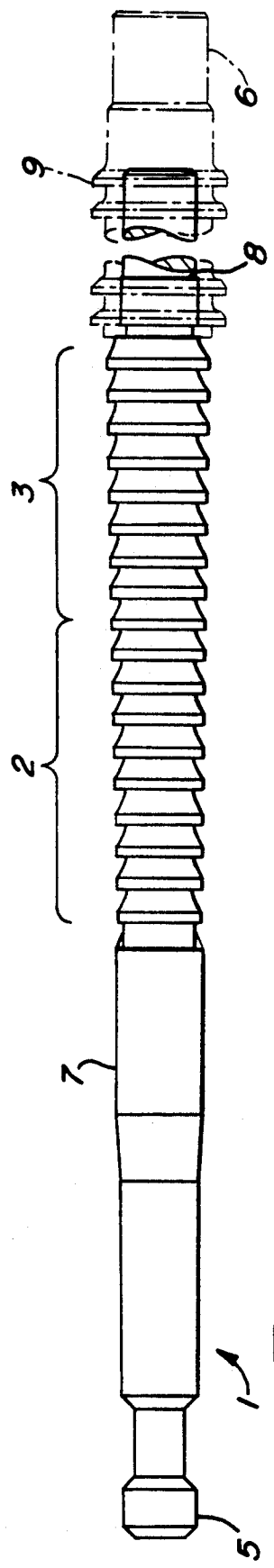

WAFER BROACHING TOOL

BACKGROUND OF THE INVENTION

The present invention generally relates to a broaching tool for gear forming. More particularly, the present invention relates to a broaching tool constructed of a plurality of wafers for finish cutting helical splines on the interior of an annular workpiece.

Broaching is a machining process in which a cutting tool that has multiple transverse cutting edges is pushed or pulled through a hole or over a surface to remove metal by axial cutting. Typically, a broach is a tapered bar formed from bar stock, into which teeth have been cut so as to produce a desired contour in a workpiece by a single pass of the tool.

A conventional prior art broaching bar for cutting a round hole in a workpiece is shown schematically in FIG. 1a, identified with reference numeral 1. Such a conventional broaching bar 1, includes three basic sections of teeth: roughing teeth 2, intermediate or semifinishing teeth 3 and finish teeth 4. Broaching bar 1 further includes a pull end 5 and a following end 6.

In use, a workpiece to be internally broached must be provided with a starting hole through which the broaching bar is pushed or pulled. Most internal broaching is accomplished by pulling the broach through the hole. With pulling there is no problem of bending, thereby allowing pull broaches to be longer than push broaches for the same size hole. The hole in the workpiece should be just large enough to permit a front pilot 7 section of the broaching bar 1 to enter freely. As the broaching bar progresses through the part, cutting commences gradually, and as each succeeding tooth engages the work it removes a small amount of metal. Since both roughing and finishing can be accomplished in a single pass of the broaching bar, broaching has proven rapid and efficient.

The limitations of broaching stem from the fundamental characteristics inherent in the process. Broaching bars are very expensive tools, and any revision in the design of a gear, such as a change in the number of teeth or the pitch diameter, would require a new broaching bar. Wear or abuse, often as simple as broken teeth, eventually necessitates replacement of the entire broaching bar.

An improvement to conventional broaching bars is described in detail in U.S. Pat. No. 4,274,767 to Bistrick, et al., entitled "Helical Toothed Broach." The broach as described in U.S. Pat. No. 4,274,767 includes a plurality of circumferentially disposed groups of cutting teeth which are integrally formed on a removable shell. Such a conventional broaching bar adapted to incorporate a removable shell is illustrated in FIG. 1b. Typically, broaching bar 1 includes roughing teeth 2 and intermediate teeth 3, and is modified to include an arbor section 8, over which the removable shell 9 fits.

Prior art broaching bars which have heretobefore been modified to include removable shells have proven to be an advance over conventional broaching bars since worn or broken teeth on the shells 9 can be replaced without replacing the entire broaching bar. However, none of such prior art is without its disadvantages. In this regard, conventional broaching tools limit the "form relieving" processes which can be used in manufacturing the finished profile for the broaching tool. Additionally, conventional broaching tools are extremely expensive in that damaged shells must be replaced in their entirety. Further, the angles of the cutting edges of conventional broaching tools are limited by having the rows of teeth integrally connected.

SUMMARY OF THE INVENTION

Accordingly, the present invention is directed to overcoming the disadvantages commonly associated with the manufacture and use of conventional broaching tools. Therefore, it is an object of the present invention to provide a cylindrical finish broaching tool which includes a plurality of individually formed wafers, each of which are formed to include an identical number of teeth.

It is still another object of the present invention to provide a cylindrical finish broach having an increased tool life.

It is still a further object of the present invention to provide a cylindrical finish broach wherein the teeth are arranged in helically aligned rows and include a cutting face perpendicular to the helix angle or some angle relative to the helix angle.

In accordance with a preferred embodiment of the present invention, there is provided a cylindrical finish broaching tool used for finish cutting helical splines on the interior of a hollow annular workpiece which comprises a lead wafer, a plurality of cutting wafers, and means for mounting the lead wafer and the plurality of cutting wafers on a trailing end of a broach bar. Means for mounting the lead wafer and the plurality of cutting wafers on the trailing end of a broach bar is provided in the form of a shell adapted to receive the lead wafers and cutting wafers, and further adapted to be received on the trailing end of the broaching bar.

Each wafer of the present invention is formed to include an identical number of teeth. All of the teeth have generally helically inclined sides which intersect a front face and a rear face to provide acute and obtuse included angles on both opposite sides of the teeth. In use, the lead wafers and cutting wafers are aligned such that each tooth of an individual wafer is helically aligned with a corresponding tooth of the other wafers. The teeth of the first, or leading wafer, serve to align the wafer broaching tool with the rough cut helical grooves previously formed by a roughing broach. The remaining wafers, or cutting wafers, serve to gradually remove material from the annular workpiece, thereby finish cutting the workpiece.

BRIEF DESCRIPTION OF THE DRAWINGS

Other features and advantages of the present invention will become apparent to one skilled in the art upon studying the following description and appended claims, taken in conjunction with the accompanying drawings in which:

FIG. 1a is a prior art illustration of a conventional broaching bar;

FIG. 1b is a prior art illustration of a broaching bar incorporating a conventional removable shell;

DETAILED DESCRIPTION OF THE PREFERRED EMBODIMENT

Figure 2:
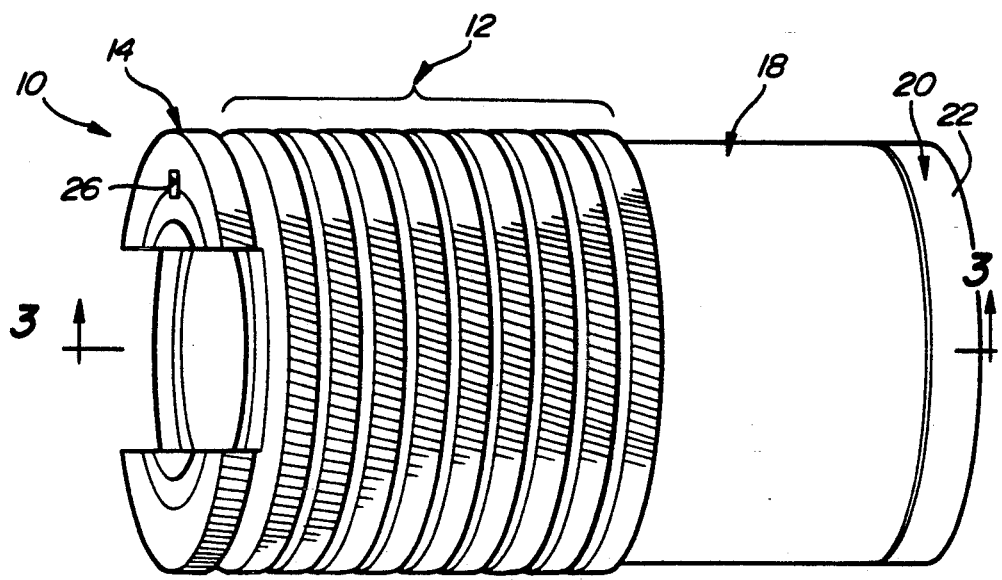
FIG. 2 is an elevational view of a wafer broaching tool made in accordance with the preferred embodiment of this invention.
Figure 3:
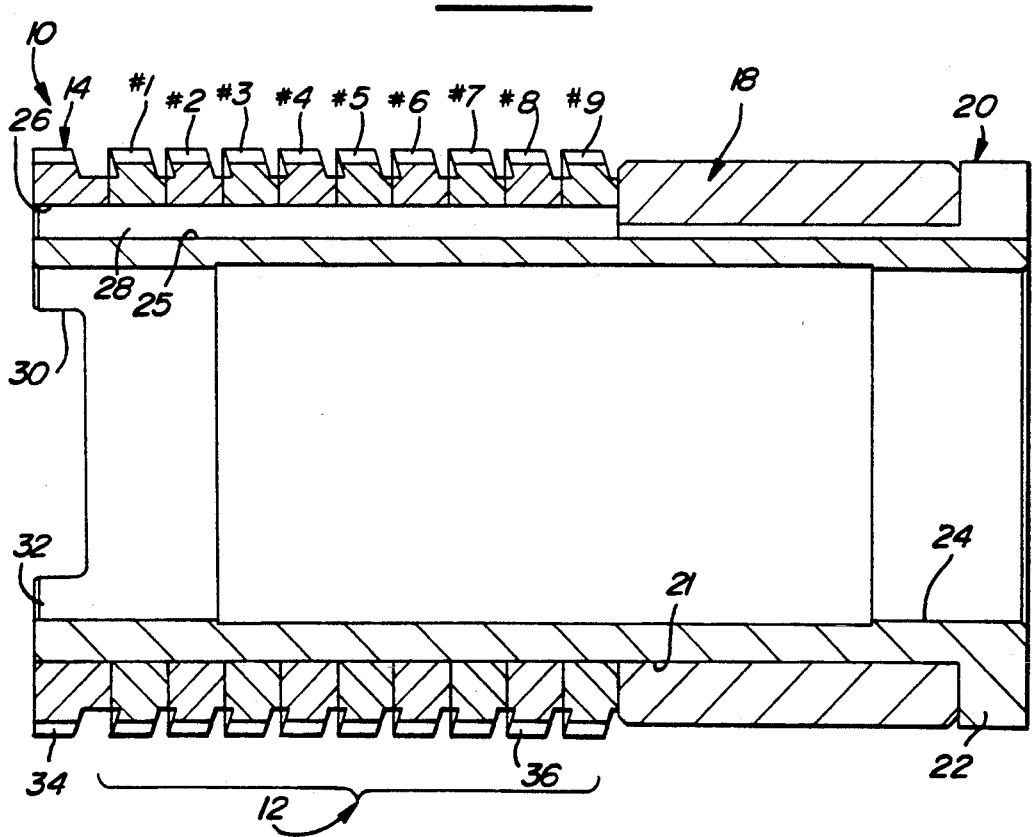
FIG. 3 is a sectional view of the wafer broaching tool of the present invention taken along the line 3—3 of FIG. 2.

With particular reference to FIGS. 2 and 3, a preferred embodiment of a wafer broaching tool 10 made in accordance with the teachings of the present invention is shown. In general, wafer broaching tool 10 is an assembly designed to be mounted to the rear end of a standard tapered progressive generating spur or helical broach bar (not shown). Alternatively, it can be used alone as a separate finishing operation. The intended use for wafer broaching tool 10 of the present invention is to finish the profile of internal helical gear teeth by shaving material from a rough tooth form via a series of cutting wafers, cumulatively referred to with reference numeral 12. Cutting wafers 12 have cutting teeth that are circumferentially positioned, progressively increasing in size, and angularly positioned relative to any helical advance within the series of wafers 12.

In the preferred embodiment, wafer broaching tool 10 includes a lead wafer 14, a plurality of cutting wafers 12, a tubular spacer 18, and a shell body 20. Lead wafer 14 and cutting wafers 12 are mounted on shell body 20 in a manner piloting the radial position of lead wafer 14 and cutting wafers 12 through the precision fit between the outside diameter of shell body 20 and the inside diameter of wafers 12, 14. Shell body 20 has an inner diameter adapted to receive a conventional tapered progressive generating spur or helical broach bar (not shown), as is used with the unitary broaching shell described in U.S. Pat. No. 4,274,767 and illustrated in FIG. 1b. In addition, outer diameter surface 21 of shell body 20 is adapted to receive spacer 18, lead wafer 14 and cutting wafers 12 thereon. A radial flange 22 is formed at a first or trailing end 24 of shell body 20. Radial flange 22 is used as a positive end stop for spacer 18 and wafers 12, 14.

Further in the preferred embodiment, shell body 20 further includes a longitudinally extending groove 25 that is adapted to cooperate with keyways 26 formed in the leading wafer 14 and cutting wafers 12 to receive an elongated key 28, and thereby affix the rotary position of lead wafer 14 and each cutting wafer 12. In practice, shell body 20 is supported at its trailing end, as is commonly known in the art, to permit limited rotation of shell body 20 in order to provide for precise alignment of wafer broaching tool 10. As will be appreciated by those skilled in the art, a locating space 30 is formed at a second or leading end 32 of shell body 20 on the broaching bar to facilitate substantial helical alignment of the finish teeth 36 with the rough teeth of the broaching bar.

With continued reference to FIGS. 2 and 3, spacer 18 is shown mounted on trailing end 24 of shell body 20 so as to be adjacent flange portion 22. Spacer 18 has a longitudinal length of sufficient dimensions to make the overall length of shell body 20 compatible with a conventional broaching bar. Accordingly, it will be appreciated that spacer 18 is not critical to the present invention and can be entirely eliminated if appropriate design changes are incorporated into shell body 20 and the broaching bar. Also, alterations to the longitudinal length of the spacer 18 will allow for the use of more or less cutting wafers 12, as desired for a particular use. Alternatively, a broaching bar can be provided having a trailing end adapted to directly receive lead wafer 14 and cutting wafers 12 of the present invention. However, this alternative is not preferred due to the tremendous cost of broaching bars and further due to the inflexibility with respect to the number of cutting wafers 12 which would be inherent in such a design.

Figures 4, 5:
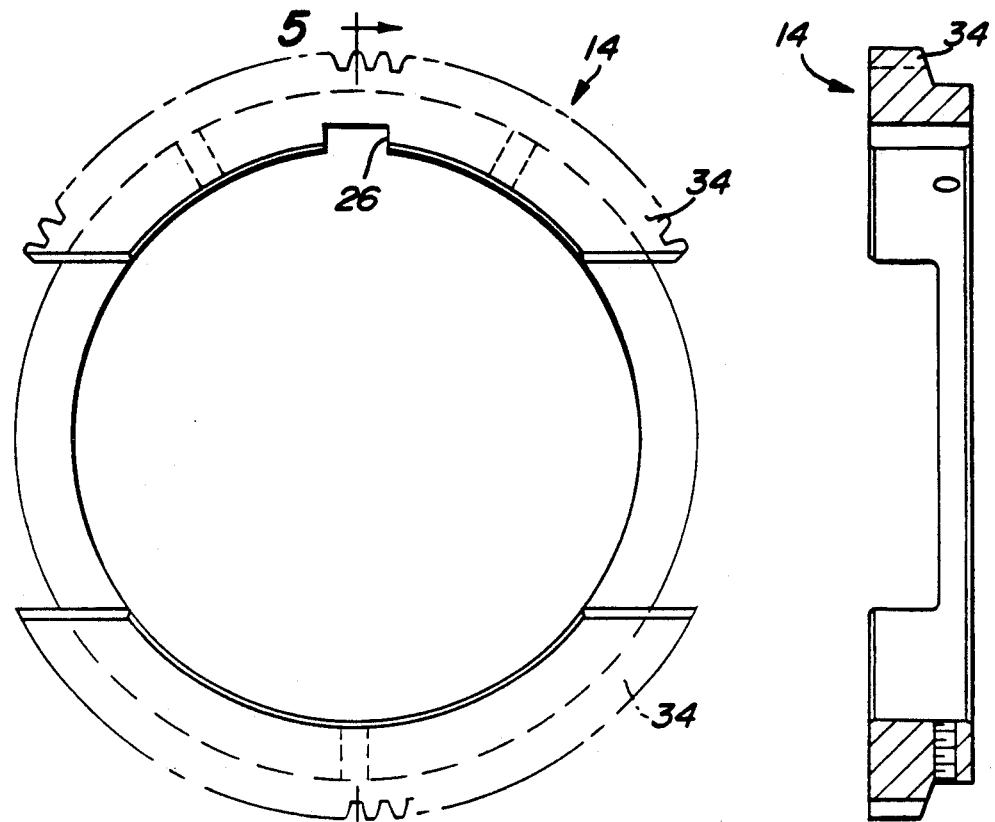
FIG. 4 is a front view of the lead wafer of the present invention.
FIG. 5 is a sectional view taken along the line 5—5 of FIG. 4.

Referring next to FIGS. 4 and 5, illustrated is lead wafer 14 of the present invention. Lead wafer 14 is shown to include a plurality of leading teeth 34. Leading teeth 34 of lead wafer 14 are formed only on radially opposing sides of lead wafer 14, thereby not interfering with locating space 32 on leading end 30 of shell body 20. In the exemplary embodiment leading teeth 34 are sized and positioned such that 91 teeth would be present if leading teeth 34 were formed around the entire perimeter of leading wafer 14. It will be appreciated by those skilled in the art, that the amount of teeth 34 present in leading wafer 14 can be readily adapted to include any particular number as dictated by the final part desired. Leading teeth 34 of lead wafer 14 are designed so as to mesh with a rough cut splines formed on a production part (not shown). It is assumed that leading teeth 34 of lead wafer 14 are dimensioned to fit accurately in the tooth spaces previously formed in a workpiece by rough broaching, or otherwise. To this end, leading teeth 34 of lead wafer 14 are front tapered. Additionally, leading teeth 34 of lead wafer 14 may, if desired, be chamfered to facilitate entry into the spaces between the rough cut teeth of the workpiece and guide wafer broaching tool 10 into precise helical alignment.

Figures 6, 7:
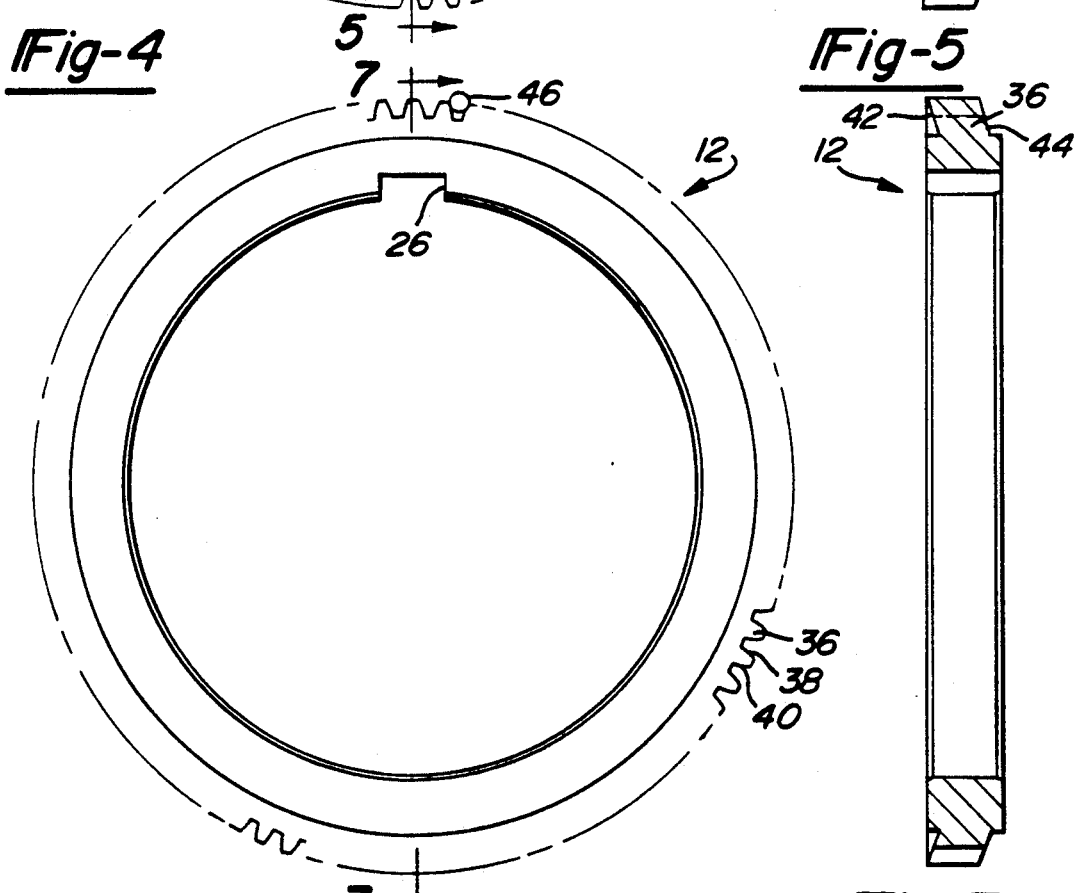
FIG. 6 is a front view of a cutting wafer of the present invention.
FIG. 7 is a sectional view taken along the line 7—7 of FIG. 6.

Referring next to FIGS. 6 and 7, illustrated is an exemplary embodiment of a cutting wafer 12 of the present invention. In the specific example illustrated, wafer broaching tool 10 includes nine cutting wafers labeled in sequence from #1 to #9. It will be appreciated by those skilled in the art that the number of cutting wafers 12 in finish broaching tool 10 may vary, being as few as possible to obtain accurate cutting and removal of defects attributable to rough cutting. Each cutting wafer 12 has an identical number of helically aligned cutting teeth 36. In the exemplary embodiment illustrated, each cutting wafer 12 includes 91 cutting teeth 36. Cutting wafers 12 are arranged to be disposed on shell body 20 so that cutting teeth 36 from the cutting wafer #1 to cutting wafer #6 are progressively increasing in size. Each cutting tooth 36 on each cutting wafer 12 has laterally spaced apart side surfaces 38,40, a leading edge 42, and a trailing edge 44. Side surfaces 38,40 extend at the helix angle of the desired production part. In the exemplary wafer broaching tool 10 illustrated, the helix angle is 30°. As will be appreciated by those skilled on the art, the helix angle of the broaching tool of the present invention is subject to modification. Laterally spaced apart side surfaces 38,40 intersect leading surface 42 and trailing surface 44 to provide acute and obtuse included angles on both opposite sides of teeth 36.

Because cutting teeth 36 of the present invention are circumferentially disposed on individual wafers 12, each individual tooth 36 can be ground with no interferences from teeth 36 of other wafers 12 which will eventually be adjacently mounted on the broaching bar in helical alignment. In this regard, the present invention provides the ability to grind an individual face angle for every single individual tooth 36. In the preferred embodiment, each cutting tooth 36 of each cutting wafer 12 is formed to include a face angle which is held to be perpendicular to the helix angle or an angle relative thereto. This is an advantage since each tooth 36 is now capable of maintaining an acute angle to the cutting surface. Accordingly, the cutting edge remains acute to the lead of the cut throughout production.

The wafer design of the present invention allows each leading edge 42 of cutting teeth 36 on cutting wafers 12 to be formed with an annular face grinding procedure. Such a procedure allows the leading edge 42 to be formed into a concave, disk-type surface. As will be appreciated by those skilled in the art, this is an advantage over the prior art in which such a surface was prohibited due to the integral nature of the rows of teeth.

A side clearance angle is ground into each cutting tooth 36, thereby creating a side clearance behind leading edge 42. Accordingly, the drag between the tool in the cut is reduced, thereby increasing the tool life and accordingly, allowing a truer tooth profile to be maintained.

In manufacture, side surface 38,40 of each cutting tooth 36 can be ground simultaneously, thereby lessening the chances for the introduction of error with respect to indexing or sizing. This process also allows cutting teeth 36 to be formed with conventional shaper manufacturer processing. Briefly, shaper machines develop cutting action from straight-line reciprocating motion between a tool and a workpiece.

Another advantage of the wafer design of the present invention is that each individual tooth can be ground with a much larger diameter grinding wheel, thereby providing a more true form throughout each individual wafer 12. In this regard, the teeth of prior art finish broaching tools are most commonly ground with a grinding wheel having a relatively small diameter such as a conventional vitrified grinding wheel. The relatively small diameter is necessitated with prior art finish broaching tools due to the proximity of the helically aligned teeth.

With a relatively small diameter grinding wheel, the cutting surface of the grinding wheel becomes worn and requires redressing before a complete pass of a group of circumferentially disposed teeth can be made. In contradistinction, the individual wafer design of the present invention allows the teeth to be ground with a significantly larger diameter grinding wheel. In this regard, a single wafer can be ground in a single pass without redressing of the grinding wheel. If redressing of the grinding wheel is required, compensation for the stock removal that is taken off the grinding wheel must be made. In the present invention, compensation is not needed, and the resultant error involved is eliminated. Accordingly, the first and last teeth ground on a particular wafer are more identical than the first and last teeth of the unitarily designed finish broaching tools of the prior art. Also, by eliminating the redressing of the grinding wheel, the manufacturing time is reduced.

When chatter develops in broaching, loss of accuracy, poor surface finish on the workpiece, and excessive broach wear are probable results. In use, wafer broaching tool 10 of the present invention provides a design in which cutting teeth 36 from at least two different cutting wafers 12 are continually in contact with the workpiece throughout a substantial portion of the finish broaching process. Preferably, cutting teeth 36 from two or three wafers 12 are in contact with the workpiece throughout the entire finish broaching process, except as finish broach tool 10 initiates and terminates contact with the workpiece. In this regard, it will be appreciated that if the part is relatively thin as compared to the thickness of wafers 12, cutting teeth 36 from more than one wafer 12 may not concomitantly contact the workpiece. By ensuring that cutting teeth 36 from two or more wafers 12 are continuously in contact with the workpiece, unnecessary chatter is eliminated from the finishing process. The number of cutting teeth 36 concomitantly in contact with the workpiece is regulated by the axial pitch of the teeth, the thickness of the individual wafers 12 and the thickness of the workpiece.

During manufacturing, the larger or rearmost cutting wafers are ground first. Accordingly, a method of manufacturing which minimizes the scrap rate is provided. If the tool maker or the machine errs in forming one of the cutting wafers 12, that wafer 12 can be ground to a smaller size. In the preferred embodiment, the dimension of cutting wafers #6 through #9, inclusive, are identical, while cutting wafers #1 through #6 are ground so as to progressively increase in size. The last four cutting wafers are the same size to ensure that the workpiece is formed within required tolerances. Thus, for example, if an error is made in grinding cutting wafer #9, cutting wafer #9 can be ground to a smaller detail, such as #5, thereby eliminating unnecessary waste.

To further minimize the scrap rate, keyway 26 is formed in individual lead wafer 14 and cutting wafers 12 during a last manufacturing step. If keyway 26 was conversely put in first, multiple grinding operations would be conducted relative to keyway 26. Since keyway 26 is formed during the last step, the operator can actually cut multiple keyways 26, if necessary, until the right positioning relative to teeth 36 is obtained.

As shown particularly in FIG. 5, the specific axial position in which keyway 26 is formed into each individual wafer 12,14 is determined with the use of a gage ball 46, as is known by those skilled in the art. Briefly, first a datum surface (not shown) is established. Next, gage ball 46 of known radius is brought into contact with two adjacent teeth. Gage ball 46 provides 2-point contact, thereby precisely positioning gage ball 46 at a consistent height with respect to each wafer 12,14 of a single wafer broaching tool 10. As is known in the art, keyway 26 is then centered at a predetermined angle (not shown) with respect to gage ball 46, at a specific axial position. In this manner, keyway 26 can be placed in the exact position that will maintain the correct position of each individual wafer 12,14 relative to the lead of the assembly 10.

The method for finish forming a helical internal gear on an inner peripheral surface of a hollow workpiece of the present invention comprises the steps of providing a broach bar having a first portion adapted to receive a lead wafer and a plurality of wafers, providing a lead wafer having a plurality of teeth, providing a plurality of cutting wafers, each cutting wafer having a plurality of helically aligned teeth, mounting the lead wafer and the cutting wafers on the trailing end of the broach bar, and passing the broach bar through the workpiece.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims. For example, it is envisioned that the wafer broach design of the present invention can be readily incorporated to include internal teeth for forming counterpart external helical gear teeth.

We claim:

1. A cylindrical finish broaching tool adapted to cooperate with a broach bar for finish cutting splines on the interior of a hollow annular workpiece, said cylindrical finish broaching tool comprising:
   a cylindrical sleeve adapted to mount on said broach bar, said sleeve having a lead end and a trailing end, said trailing end being integrally formed to include a flange extending radially therefrom;
   a plurality of toroidal cutting wafers removably mounted on said sleeve, each cutting wafer having peripherally thereon a plurality of cutting teeth disposed such that teeth on adjacent cutting wafers form a corresponding plurality of rows of teeth;
   a toroidal lead wafer removably mounted on said sleeve, said lead wafer having peripherally thereon a plurality of lead teeth; and
   means for limiting rotational movement of each of said plurality of cutting wafers and said lead wafer with respect to said sleeve.

2. The broaching tool of claim 1, wherein each tooth of said plurality of cutting teeth is disposed at an angle such that each row of said plurality of rows is helical.

3. The broaching tool of claim 1, wherein each tooth of said plurality of lead teeth is aligned along a predetermined helical angle with a cutting tooth of each of said plurality of cutting wafers.

4. The broaching tool of claim 3, wherein each tooth of said plurality of cutting teeth has a front surface substantially perpendicular to said helical angle.

5. The broaching tool of claim 4, wherein said front surface of each of said plurality of cutting teeth is concave.

6. The broaching tool of claim 1, wherein said means for limiting rotational movement comprises a key and further wherein a first keyway is formed axially along said sleeve and a second corresponding keyway extends through each of said plurality of cutting wafers.

7. The broaching tool of claim 6, wherein said second corresponding keyway extends through said lead wafer.

8. The broaching tool of claim 7, further comprising a cylindrical spacer indisposed between said flange and said plurality of cutting wafers.

* * * * *